US010298372B2

(12) United States Patent
Zhu et al.

(10) Patent No.: US 10,298,372 B2
(45) Date of Patent: May 21, 2019

(54) ENHANCED PHYSICAL DOWNLINK CONTROL CHANNEL IN MACHINE-TYPE COMMUNICATION

(71) Applicant: Intel IP Corporation, Santa Clara, CA (US)

(72) Inventors: Yuan Zhu, Beijing (CN); Gang Xiong, Beaverton, OR (US); Debdeep Chatterjee, Mountian View (CA); Seunghee Han, Cupertino, CA (US); Jong-Kae Fwu, Sunnyvale, CA (US)

(73) Assignee: Intel IP Corporation, Santa Clara, CA (US)

( * ) Notice: Subject to any disclaimer, the term of this patent is extended or adjusted under 35 U.S.C. 154(b) by 32 days.

(21) Appl. No.: 15/520,981

(22) PCT Filed: Nov. 5, 2015

(86) PCT No.: PCT/US2015/059303
§ 371 (c)(1),
(2) Date: Apr. 21, 2017

(87) PCT Pub. No.: WO2016/073762
PCT Pub. Date: May 12, 2016

(65) Prior Publication Data
US 2018/0026759 A1    Jan. 25, 2018

Related U.S. Application Data

(60) Provisional application No. 62/075,426, filed on Nov. 5, 2014.

(51) Int. Cl.
*H04L 5/00* (2006.01)
*H04W 4/70* (2018.01)
*H04W 72/04* (2009.01)

(52) U.S. Cl.
CPC ............ *H04L 5/005* (2013.01); *H04L 5/0044* (2013.01); *H04L 5/0053* (2013.01); *H04W 4/70* (2018.02); *H04W 72/042* (2013.01)

(58) Field of Classification Search
CPC ..... H04L 5/005; H04L 5/0044; H04L 5/0053; H04W 72/042; H04W 4/70
See application file for complete search history.

(56) References Cited

U.S. PATENT DOCUMENTS

2013/0195041 A1*  8/2013  Papasakellariou .. H04W 72/042
                                                    370/329
2013/0242886 A1*  9/2013  Chen ................. H04W 72/0413
                                                    370/329
(Continued)

FOREIGN PATENT DOCUMENTS

WO       2016018526 A1    2/2016

OTHER PUBLICATIONS

International Search Report and Written Opinion for International Application No. PCT/US2015/059303 dated Jan. 27, 2016; 12 pages.

(Continued)

*Primary Examiner* — Steven H Nguyen
(74) *Attorney, Agent, or Firm* — Schwabe, Williamson & Wyatt, P.C.

(57) ABSTRACT

The present disclosure describes embodiments of apparatuses, systems, and methods for that include and apply an association between one or more first antenna ports that carry Enhanced Physical Downlink Control Channel (EPDCCH) data and one or more second antenna ports that carry Physical Downlink Shared Channel (PDSCH) data in connection with machine type communications.

23 Claims, 8 Drawing Sheets

(56) References Cited

U.S. PATENT DOCUMENTS

| | | | |
|---|---|---|---|
| 2014/0314007 A1* | 10/2014 | Chen | H04B 7/00 370/329 |
| 2015/0036653 A1* | 2/2015 | Kim | H04L 5/0025 370/330 |
| 2015/0085785 A1* | 3/2015 | Kim | H04L 5/0092 370/329 |
| 2015/0189660 A1* | 7/2015 | Morioka | H04W 72/0453 370/329 |
| 2015/0256403 A1* | 9/2015 | Li | H04W 4/70 370/235 |
| 2015/0304993 A1* | 10/2015 | Shimezawa | H04L 5/001 370/329 |
| 2015/0365926 A1* | 12/2015 | Long | H04W 4/70 370/329 |
| 2016/0037514 A1 | 2/2016 | Xiong et al. | |

OTHER PUBLICATIONS

Ericsson, ST-Ericsson; "Transmission mode handling for NCT," Agenda Item: 7.2.1.3, 3GPP TSG-RAN WG1 #72bis, R1-131448, Chicago, USA, Apr. 15-19, 2013; 4 pages.

Panasonic; "Association between DM-RS ports and EPDCCH transmission," Agenda Item: 6.2.3.4, 3GPP TSG RAN WG1 Meeting #71, R1-124786, New Orleans, USA, Nov. 12-16, 2012; 4 pages.

Samsung; "Association between antenna ports and ePDCCH transmissions," Agenda Item: 7.6.1, 3GPP TSG RAN WG1 #69, R1-122249, Prague, Czech Republic, May 21-25, 2012; 6 pages.

ZTE; "PDSCH PRB locations for common channels and unicast transmissions for low cost MTC UEs," Agenda Item: 7.2.2.1, 3GPP TSG RAN WG1 Meeting #76bis, R1-141412, Shenzhen, China, Mar. 31-Apr. 4, 2014; 8 pages.

Ericsson, Nokia Networks; "New WI proposal: Further LTE Physical Layer Enhancements for MTC," Agenda Item: 14.1.1, 3GPP TSG RAN Meeting #65 RP-141660; Edinburgh, Scotland, Sep. 9-12, 2014; 9 pages.

3GPP TS 36.213 V12.2.0 (Jun. 2014); "Technical Specification Group Radio Access Network; Evolved Universal Terrestrial Radio Access (E-UTRA); Physical layer procedures (Release 12)," 207 pages.

3GPP TS 36.211 V12.3.0 (Sep. 2014); "Technical Specification Group Radio Access Network; Evolved Universal Terrestrial Radio Access (E-UTRA); Physical channels and modulation (Release 12)," 124 pages.

* cited by examiner

ENHANCED PHYSICAL DOWNLINK CONTROL CHANNEL IN MACHINE-TYPE COMMUNICATION

CROSS REFERENCE TO RELATED APPLICATIONS

The present application is a national phase entry under 35 U.S.C. § 371 of International Application No. PCT/US2015/059303, filed Nov. 5, 2015, entitled "ENHANCED PHYSICAL DOWNLINK CONTROL CHANNEL IN MACHINE-TYPE COMMUNICATION", which claims priority to U.S. provisional Patent Application No. 62/075,426 filed Nov. 5, 2014, the entire disclosures of which are hereby incorporated by reference, except for those sections, if any, that are inconsistent with this specification.

FIELD

Embodiments of the present disclosure generally relate to the field of wireless communication, and more particularly, to methods and apparatuses for machine-type communications in cellular networks.

BACKGROUND

Machine-Type Communication (MTC) is a promising and emerging technology to enable a ubiquitous computing environment towards the concept of "Internet of Things." Potential MTC-based applications include smart metering, healthcare monitoring, remote security surveillance, intelligent transportation system, etc. These services and applications may stimulate the design and development of a new type of MTC device that may be seamlessly integrated into current and next generation mobile broadband networks such as LTE and LTE-Advanced.

The existing mobile broadband networks were designed to optimize performance mainly for human-type communications and thus are not generally designed or optimized to meet MTC related requirements. MTC specific design have been studied by Third Generation Partnership Project (3GPP) Radio Access Network (RAN) working groups (WGs) for specification support in Release-12 and -13 LTE specifications, for example. The studies are focused on lower MTC device cost, enhanced coverage for MTC devices, and reduced power consumption of MTC devices.

To further reduce cost and power consumption, MTC device bandwidth may be 1.4 MHz for uplink and downlink. This value is the minimum bandwidth for an LTE system, which has bandwidths of 20, 15, 10, 5, 3, and 1.4 MHz in the specifications. In some embodiments for MTC devices, the transmission bandwidth for both control and data channels may be 1.4 MHz. Generally, a large number of MTC devices may be deployed for specific services within one cell. When a large number of MTC devices attempt to access and communicate within a network, multiple MTC regions that each have a 1.4 MHz bandwidth may be allocated by a network node such as an eNodeB.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
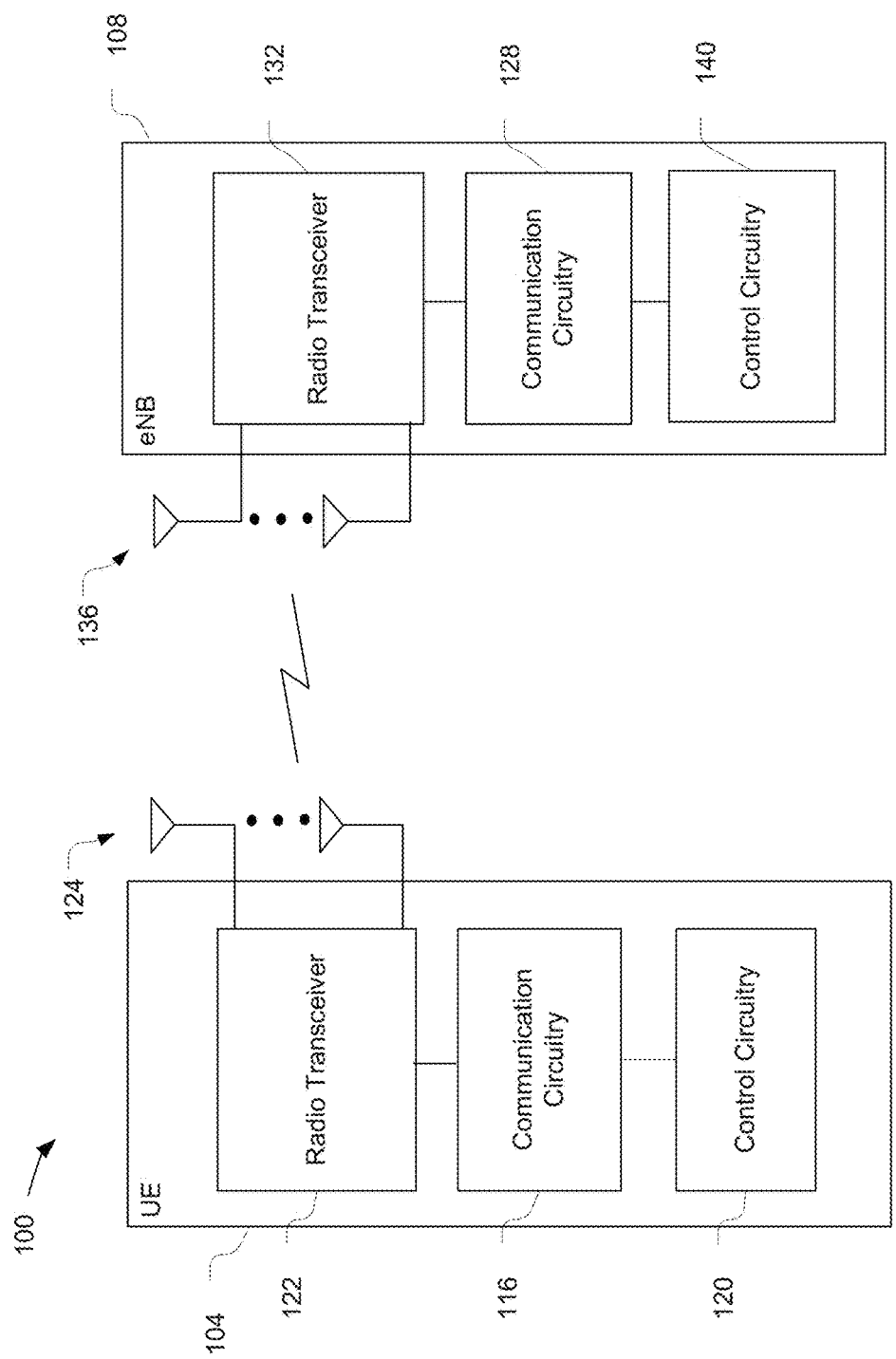
FIG. 1 schematically illustrates a wireless communication environment in accordance with various embodiments.

Embodiments of the present disclosure describe apparatuses and methods for LTE frame timing and structures that may relate to enhanced physical control channel-based downlink control channel for machine type user equipment with reduced bandwidth support, including associated techniques and configurations. In the following description, various aspects of the illustrative implementations are described using terms commonly employed by those skilled in the art to convey the substance of their work to others skilled in the art. However, it will be apparent to those skilled in the art that embodiments of the present disclosure may be practiced with only some of the described aspects. For purposes of explanation, specific numbers, materials, and configurations are set forth in order to provide a thorough understanding of the illustrative implementations. However, it will be apparent to one skilled in the art that embodiments of the present disclosure may be practiced without the specific details. In other instances, well-known features are omitted or simplified in order not to obscure the illustrative implementations.

In the following detailed description, reference is made to the accompanying drawings that form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrases "A or B" and "A and/or B" mean (A), (B), or (A and B). For the purposes of the present disclosure, the phrase "A, B, and/or C" means (A), (B), (C), (A and B), (A and C), (B and C), or (A, B, and C).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment," or "in embodiments," which may each refer to one or more of the same or different embodiments. Furthermore, the terms "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. By way of example and not limitation, "coupled" may mean two or more elements or devices are coupled by electrical connections on a printed circuit board such as a motherboard for example. By way of example and not limitation, "coupled" may mean two or more elements/devices cooperate and/or interact through one or more network linkages such as wired and/or wireless networks. By way of example and not limitation, a computing apparatus may include two or more computing devices "coupled" by one or more network linkages.

As used herein, the term "circuitry" may refer to, be part of, or include an Application Specific Integrated Circuit (ASIC), an electronic circuit, a field programmable device such as a field programmable gate array (FPGA), a system-on-chip (SoC), a processor (shared, dedicated, or group), and/or memory (shared, dedicated, or group) that execute one or more software or firmware programs, a combinational logic circuit, and/or other suitable components that provide the described functionality. The term "logic" or "computer logic" includes software and/or hardware implementations of logical operations on data. Logic in a hardware implementation may include a computer switching circuit that consists of a number of logic gates and performs logical operations on data. Logic in a software implementation may include software code that performs the logical functions of a number of logic gates and performs logical operations on data.

FIG. 1 schematically illustrates a wireless communication system 100 in accordance with various embodiments. The system 100 may include a user equipment (UE) 104 and an evolved node B (eNB) 108. The eNB 108 may be an access node of a 3rd Generation Partnership Project (3GPP) network and may incorporate or apply any of a variety of standards, formats, or conventions including, Global System for Mobile Communications (GSM), Extended Coverage GSM (EC-GSM), Long Term Evolution (LTE), etc.

The UE 104 may be any type of computing device equipped with wireless communication circuitry and adapted to communicate through a RAN according to, for example, one or more 3GPP Technical Specifications. The UE 104 may include, but is not limited to, a phone, a computer, a sensor, or any other device that is configured for wireless communication through a radio access network (RAN). In various embodiments, the UE 104 may be a UE primarily designed for MTC and may be referred to as an MTC UE 104.

The UE 104 may include communication circuitry 116, control circuitry 120, radio transceiver 122, and one or more antennas 124. Communication circuitry 116 may interface with the radio transceiver 122 to receive radio frequency (RF) signals from and/or send RF signals to one or more components, for example, BS 108, over an air interface via the one or more antennas 124 according to one or more standard protocols. In some embodiments, circuitry of the communication circuitry 116 or the radio transceiver circuitry used to transmit signals may be referred to as transmit circuitry, while circuitry of the communication circuitry 116 or the radio transceiver circuitry used to receive signals may be referred to as receive circuitry.

In embodiments, the MTC UE 104 may upload or uplink to eNB 108 data from a machine, device, system, etc. (not shown) that may be associated with, connected to, or in communication with MTC UE 104. Such data may be referred to as MTC data, and the MTC UE 104 together with its associated machine, device, system, etc. (not shown) may be referred to as a Cellular Internet of Things device (CIoT device). In embodiments, the MTC UE 104 may communicate MTC data to eNB 108 in burst transmissions, which may include small burst transmissions that may be occasional or infrequent, and/or periodic or aperiodic, and/or scheduled or unscheduled.

The communication circuitry 116 may include signal-construction circuitry including, but not limited to, an encoder to encode input data, and a modulator to modulate a carrier signal to include the encoded input data to be transmitted. The communication circuitry 116 may further include signal-deconstruction circuitry including, but not limited to, a demodulator to provide encoded data from a modulated carrier signal, and a decoder to provide data from encoded data.

The radio transceiver 122 may provide for the transmission and reception of the RF signals. The radio transceiver 122 may have RF transmit circuitry such as, but not limited to, an up-converter to convert baseband signals to radio-frequency signals, and a power amplifier (PA) to amplify the RF signals for transmission. The radio transceiver 122 may further have RF receive circuitry such as, but not limited to, a low-noise amplifier to amplify a received RF signal, a filter to filter a received RF signal, and a downconverter to convert an RF signal to a baseband signal. The control circuitry 120 may be coupled to communication circuitry 116, and may be configured to perform higher layer operations, for example, operations at layers in a communication protocol stack that are higher than layers of the communication protocol stack that perform the operations of the communication circuitry 116 for the radio transceiver 122. Control circuitry 120 may include one or more single-core or multi-core processors. The processor(s) may include any combination of general-purpose processors and/or dedicated processors (e.g., graphics processors, application processors, etc.). The processors may be coupled with memory/storage to execute instructions stored in the memory/storage to enable various operations, applications, and/or operating systems running on the system.

In some embodiments, the communication circuitry 116 and the control circuitry 120 may, collectively, provide the majority or all of the operations related to the communication protocol stack. The communication circuitry 116 and the control circuitry 120 may include, or be a part of, baseband circuitry (for example, a baseband chipset), a PC card, a connect card, a mobile broadband modem, etc.

The eNB 108 may include communication circuitry 128 to interface with transceiver 132 to communicate over the air interface to, for example, receive uplink RF signals from UE 104 via one or more antennas 136 and transmit downlink RF signals to UE 104 via the one or more antennas 136. In some embodiments, the communication circuitry 128 may have signal-construction circuitry and signal-deconstruction circuitry that complement the corresponding circuitry in communication circuitry 116. Similarly, the transceiver 132 may include RF transmit circuitry and RF receive circuitry that complement the corresponding circuitry in radio transceiver 122.

The eNB 108 may also include control circuitry 140 coupled with communication circuitry 128. The control circuitry 140 may be configured to perform higher layer operations to control aspects of wireless communications in the cell provided by the eNB 108.

In addition to communication over the air interface, the components of the UE 104 and eNB 108 may include circuitry to communicate over one or more additional wired or wireless interfaces. For example, in some embodiments, the transceiver 132 may include an Ethernet interface to support S1-AP signaling over Ethernet networks such as, but not limited to, fiber-optic gigabit and 10 Gigabit Ethernet, to provide the S1-MME interface.

Wireless mobile communication technology uses various standards and protocols to transmit data between eNB 108 and UE 104. Some wireless devices communicate using orthogonal frequency-division multiple access (OFDMA) in a downlink (DL) transmission and single carrier frequency division multiple access (SC-FDMA) in an uplink (UL) transmission, for example. Standards and protocols that use orthogonal frequency-division multiplexing (OFDM) modulation for signal transmission include the third generation partnership project (3GPP) long term evolution (LTE), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard, which is commonly known to industry groups as WiFi.

In LTE, for example, a frame may include 10 subframes, and each subframe may include 2 slots. Radio resources may be allocated in units of Physical Resource Blocks (PRBs), and each PRB may contain 12 subcarriers and one slot. In normal Cyclic Prefix, a PRB may contain 12 subcarriers over seven symbols (e.g., OFDM symbols). In extended CP, the PRB may contain six symbols (e.g., OFDM symbols). An entire PRB may include a PRB pair in which two continuous PRBs use the same subcarriers in a sub-frame.

Data can be transmitted from the eNB 108 to the UE 104 via a physical downlink shared channel (PDSCH). A physical downlink control channel (PDCCH) can be used to transfer downlink control information (DCI), which may inform the UE 104 about resource allocations or scheduling related to downlink resource assignments on the PDSCH, uplink resource grants, and uplink power control commands. The DCI may include or aid estimation of the channel for the PDSCH. For MTC UEs 104 operating at reduced bandwidth of 1.4 MHz, for example, a narrowband physical downlink control channel (PDCCH) or an enhanced-PDCCH (EPDCCH) may be used to transfer downlink control information (DCI). EPDCCH and PDSCH transmissions may be on or via various antenna ports or channels.

Multiple MTC UE 104, including large numbers of MTC UE 104, may be deployed for various services within a cell. For reduced cost and complexity in embodiments, some MTC UE 104 may include only 1 receive antenna, which may result in performance degradation of ~2.5-4 dB in comparison to UE 104 having 2 receive antennas. In embodiments, improved performance or coverage of EPDCCH, including channel estimation, may be provided to accommodate multiple MTC UE 104, which may include a large number of MTC UE 104.

Figure 2:
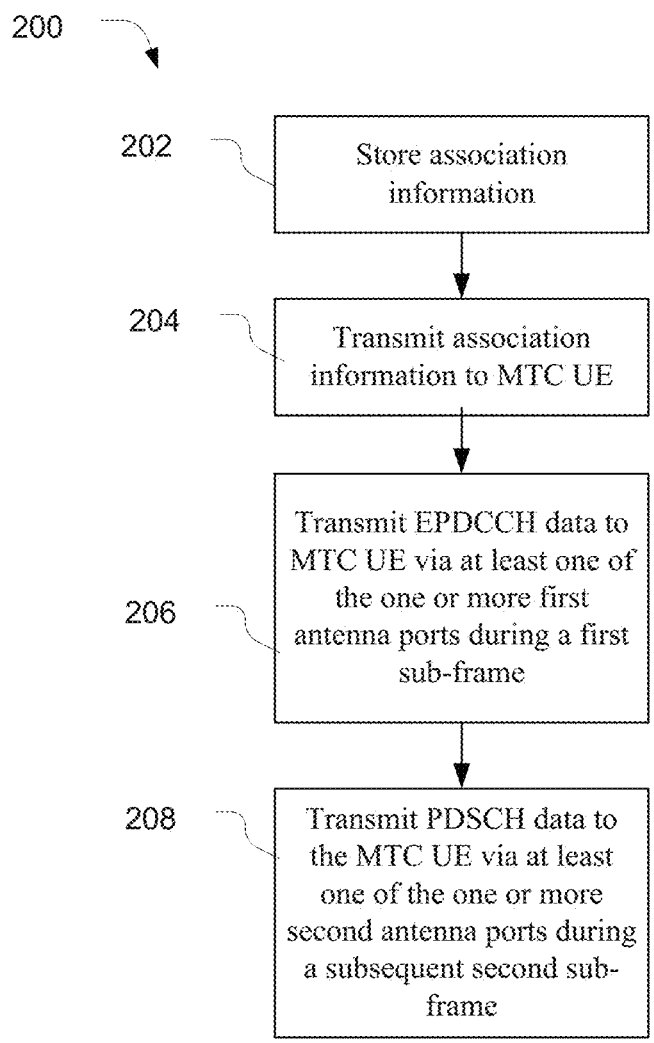
FIG. 2 is a flowchart describing operations of enhanced physical downlink control channel (EPDCCH) in MTC in accordance with various embodiments.

FIG. 2 is a flowchart 200 describing operations of an Enhanced Physical Downlink Control Channel (EPDCCH) with in accordance with some embodiments. The operations described in FIG. 2 may be performed by eNB 108 in accordance with some embodiments. The operations may be performed at least in part by one or more processors that may be coupled with memory/storage to execute instructions stored in the memory/storage.

At 202, the BS may store association information that includes an association between one or more first antenna ports that carry Enhanced Physical Downlink Control Channel (EPDCCH) data and one or more second antenna ports that carry Physical Downlink Shared Channel (PDSCH) data.

At 204, the BS may transmit the association information to Machine Type Communication (MTC) User Equipment (UE).

At 206, the BS may transmit EPDCCH data to the MTC UE via at least one of the one or more first antenna ports during a first sub-frame.

At 208, the BS may transmit PDSCH data to the MTC UE via at least one of the one or more second antenna ports during a subsequent second sub-frame. In embodiments, the first and second sub-frames may be included within a common physical resource block (PRB) bundle.

The operations of FIG. 2 employ a relationship or association between antenna ports for EPDCCH and subsequent PDSCH to improve channel estimation, (e.g. EPDCCH data-aid channel estimation for PDSCH channel). Information about the relationship or association may be provided by the eNB 108 to the MTC UE 104. Based on the association information, the MTC UE 104 may use the channel on which eNB 108 transmits EPDCCH data from first selected antenna ports in one sub-frame to estimate the channel over which eNB 108 will transmit PDSCH data from second selected antenna ports in one or more subsequent sub-frames (e.g., the next sub-frame). This may provide improved estimation by the MTC UE 104 of the channel on which the PDSCH will be delivered, and the estimation may use fewer resources of the MTC UE 104.

In some embodiments, for example, the association information may associate one or more specified antenna ports (e.g., user equipment reference channel signal (UERS) antenna ports 107, 108, 109, 110) that carry the EPDCCH data or symbols in one sub-frame with one or more specified antenna ports (e.g., UERS antenna ports 7, 8) that carry the PDSCH data or symbols in a subsequent sub-frame. With the association information, the MTC UE 104 may estimate or infer the channel that the PDSCH data or symbols are to be conveyed or transmitted by eNB 108 over one of one or more specified antenna ports in one sub-frame (e.g., UERS antenna ports 7, 8) based upon the channel EPDCCH data or symbols are conveyed or transmitted by eNB 108 over one of one or more specified antenna ports in a prior sub-frame (e.g., UERS antenna ports 107, 108, 109, 110).

Figure 3:
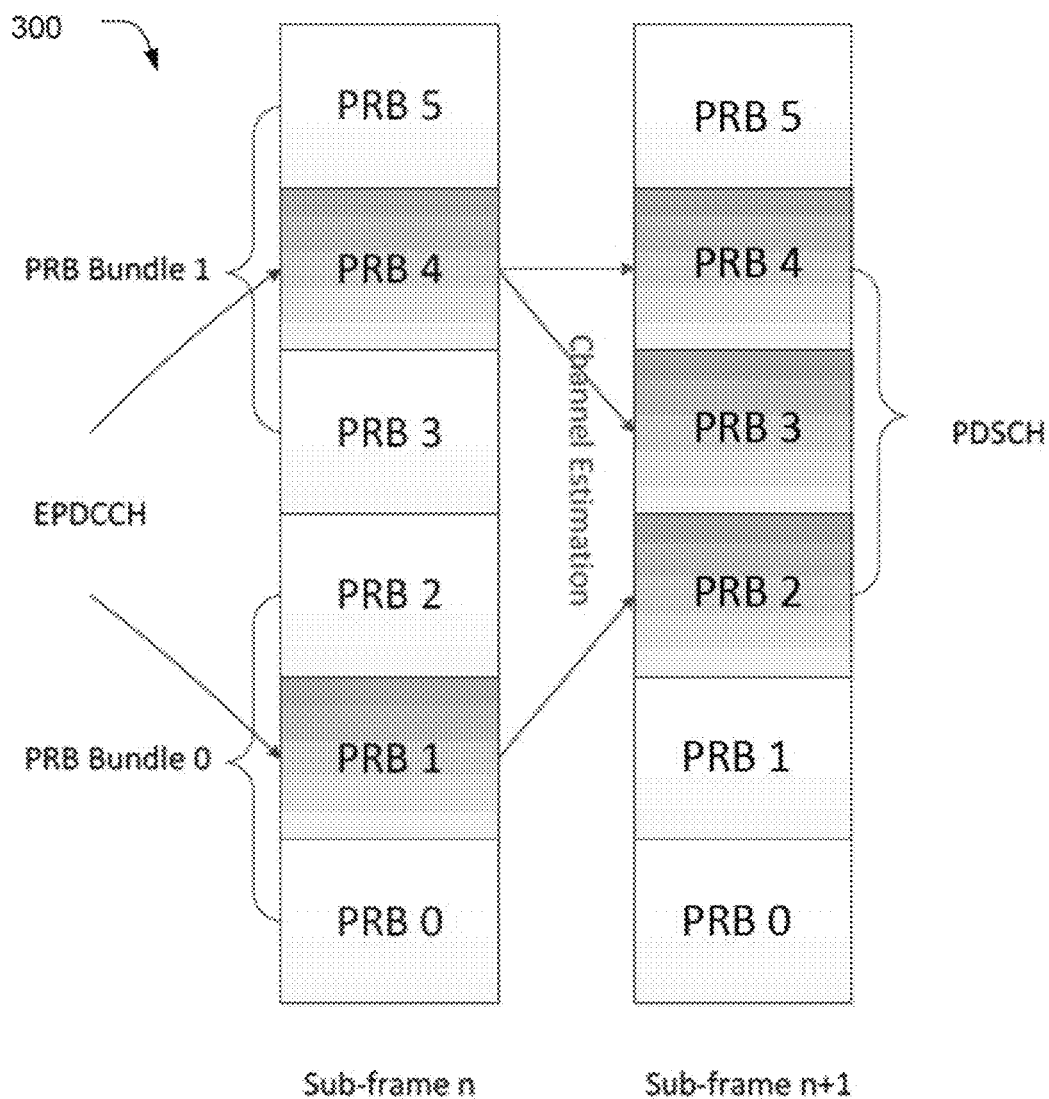
FIG. 3 schematically illustrates channel estimation between EPDCCH and a physical downlink shared channel (PDSCH) in MTC.

FIG. 3 schematically illustrates an example of channel estimation or scheduling 300 that may occur in MTC UE 104, for example, and may include an antenna port association between EPDCCH in a sub-frame n and a PDSCH in sub-frame n+1. In this example, a MTC UE may be configured with a distributed EPDCCH set that includes two Physical Resource Blocks (PRB)s, PRB 1 and PRB 4, that may be included in PRB Bundle 0 and PRB Bundle 1, respectively. In sub-frame n, eNB 108 may use the EPDCCH to transmit one downlink grant to schedule PDSCH transmission in PRB 2, 3, 4 of sub-frame n+1. The MTC UE 104 may be configured with transmission mode 9, and the PDSCH may use rank 1 transmission on DMRS port 7, for example.

An association may be set by which the MTC UE 104 may infer the channel on which the PDSCH is to be conveyed (e.g., on DMRS port 7) based on the channel over which the EPDCCH data or symbols are conveyed (e.g., on DMRS port 107). In embodiments, the MTC UE 104 may use EPDCCH resource elements (REs) associated with DMRS port 107 in PRB 4 of sub-frame n to estimate the channel of PDSCH in PRB 3 and 4 of sub-frame n+1. Also, the MTC UE 104 may use EPDCCH REs associated with DMRS port 107 in PRB 1 of sub-frame n to estimate the channel of PDSCH in PRB 2 in frame n+1.

Figure 4:
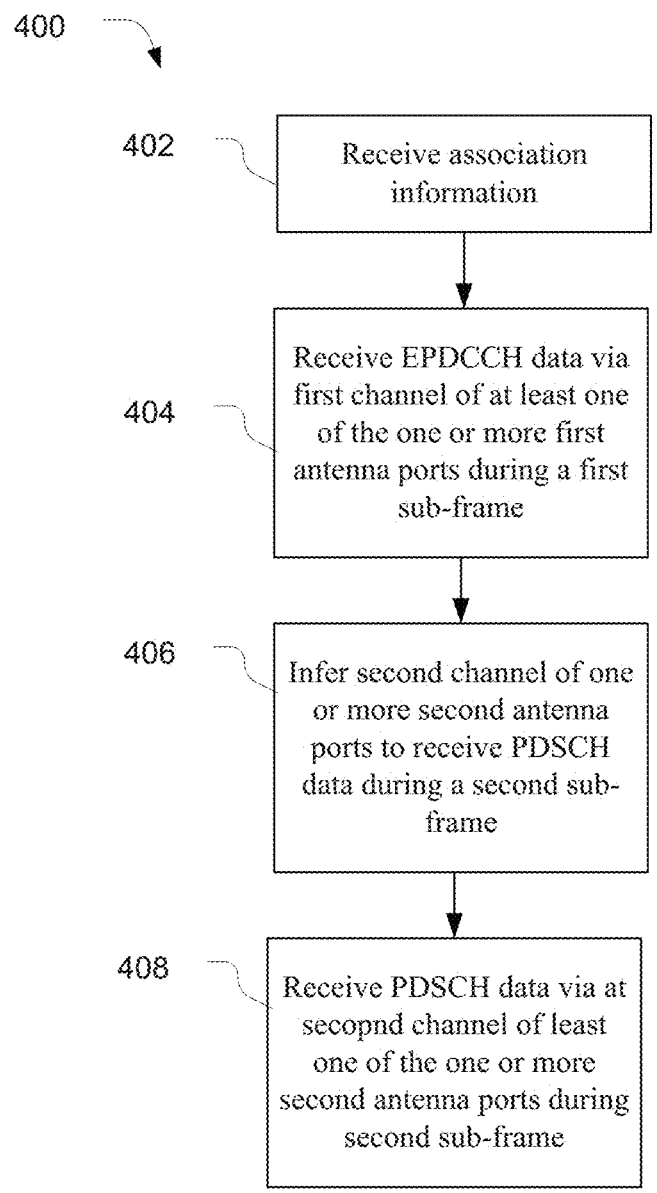
FIG. 4 is a flowchart describing operations of an Enhanced Physical Downlink Control Channel (EPDCCH) with in accordance with some embodiments.

FIG. 4 is a flowchart 400 describing operations of an Enhanced Physical Downlink Control Channel (EPDCCH) with in accordance with some embodiments. The operations described in FIG. 4 may be performed by MTC UE 104 in accordance with some embodiments. The operations may be performed at least in part by one or more processors that may be coupled with memory/storage to execute instructions stored in the memory/storage.

At 402, the MTC UE may receive association information that includes an association between one or more first antenna ports that carry Enhanced Physical Downlink Control Channel (EPDCCH) data and one or more second antenna ports that carry Physical Downlink Shared Channel (PDSCH) data. In embodiments, the MTC UE may receive the association information from a eNB.

At 404, the UE may receive EPDCCH data from a eNB via a first channel of at least one of the one or more first antenna ports during a first sub-frame.

At 406, the UE may infer a second channel of one or more second antenna ports to receive PDSCH data from the eNB during a subsequent sub-frame.

At 408, the UE may receive PDSCH data from a eNB via the second channel of at least one of the one or more second antenna ports during the subsequent sub-frame. In embodiments, the first and second sub-frames may be included within a common physical resource block (PRB) bundle.

In embodiments, associations between antenna port or channels of EPDCCH in one sub-frame and a PDSCH in another sub-frame may be fixed or may vary according to selected one or more dependencies. Examples of fixed associations may include:

The channel from which the PDSCH is conveyed or transmitted using DMRS port 7 or 8 for a sub-frame n+1 can be inferred from the channel over which the EPDCCH data symbols are conveyed using DMRS port 107 for a sub-frame n of the same PRB bundle in a distributed EPDCCH set, or The channel from which the PDSCH is conveyed or transmitted using DMRS port 7 or 8 for a sub-frame n+1 can be inferred from the channel over which EPDCCH data symbols are conveyed using of DMRS port 109 for a sub-frame n of the same PRB bundle in a distributed EPDCCH set, or The channel from which the PDSCH is conveyed or transmitted using DMRS port 7 or 8 for a sub-frame n+1 can be inferred from the channel over which the EPDCCH data symbols are conveyed using DMRS port 108 for a sub-frame n of the same PRB bundle in a distributed EPDCCH set in extended CP.

In embodiments, associations between antenna port or channels of EPDCCH in one sub-frame and a PDSCH in another sub-frame may vary according to, or depend on, Radio Network Temporary Identifier (RNTI) associated with the MTC UE or groups of MTC UE. Groups of MTC UE may be identified or associated with group information, which may include at least one of group paging identifier information (GP-RNTI: Group paging Radio Network Temporary Identifier), a public cell radio network temporary identifier (C-RNTI, cell Radio Network Temporary Identifier or MTC-RNTI), and public radio bearer (RB, radio bearer) information. Examples of associations that may depend on RNTI include:

The channel from which the PDSCH is conveyed or transmitted using DMRS port 7 or 8 for a sub-frame n+1 can be inferred from the channel over which the EPDCCH data symbols are conveyed using a DMRS port for a sub-frame n of the same PRB bundle, wherein the DMRS port is determined as 107+mod(nRNTI,2)*2, in which "mod" is a modulo or modulus operation, nRNTI is the RNTI for one or more MTC UE and the dividend in the operation with a divisor 2, for normal CP The channel from which the PDSCH is conveyed or transmitted using DMRS port 7 or 8 for a sub-frame n+1 can be inferred from the channel over which the EPDCCH data symbols are conveyed using a DMRS port for a sub-frame n of the same PRB bundle, wherein the DMRS port is determined as 107+mod(nRNTI,2) for extended CP In embodiments, associations between antenna port or channels of EPDCCH in one sub-frame and a PDSCH in another sub-frame may vary according to, or depend on, a time factor. Examples of associations that may depend on time include:

The channel from which the PDSCH is conveyed or transmitted using DMRS port 7 or 8 for a sub-frame n+1 can be inferred from the channel over which EPDCCH data symbols are conveyed using a DMRS port for a sub-frame n of the same PRB bundle, wherein the DMRS port is determined as 107+mod(t,2)*2 for normal CP, where t may be the sub-frame number or system frame number The channel from which the PDSCH is conveyed or transmitted using DMRS port 7 or 8 for a sub-frame n+1 can be inferred from the channel over which EPDCCH data symbols are conveyed using a DMRS port for a sub-frame n of the same PRB bundle, wherein the DMRS port is determined as 107+mod(t,2) for extended CP, where t may be the sub-frame number or system frame number The channel from which the PDSCH is conveyed or transmitted using DMRS port 7 or 8 for a sub-frame n+1 can be inferred from the channel over which EPDCCH data symbols are conveyed using a DMRS port for a sub-frame n of the same PRB bundle, wherein the DMRS port is determined as 107+mod($Y_k$,2)*2 for normal CP, in which Yk may be determined as mod $((A*Y_{k-1}), D)$, with A=65537, D=65537, and k=$n_s$/2, where $n_s$ is the slot number within a radio frame, as described section 9.1 of 3GPP Technical Specification, LTE; Evolved Universal Terrestrial Radio Access (E-UTRA); Physical layer procedures (3GPP TS 36.213 version 9.3.0 Release 9).

The channel from which the PDSCH is conveyed or transmitted using DMRS port 7 or 8 for a sub-frame n+1 can be inferred from the channel over which EPDCCH data symbols are conveyed using a DMRS port for a sub-frame n of the same PRB bundle, wherein the DMRS port is determined as 107+mod(Yk,2) for extended CP.

Figure 5:
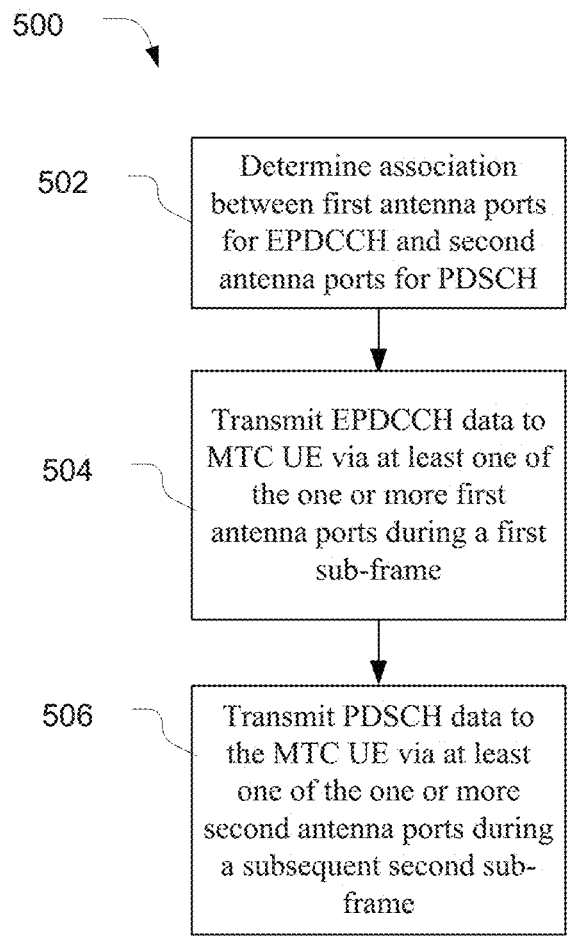
FIG. 5 is a flowchart describing operations of an Enhanced Physical Downlink Control Channel (EPDCCH) with in accordance with other embodiments.

In other embodiments with MTC UE with localized EPDCCH, for example, the antenna port for EPDCCH may be determined by the aggregation level and MTC UE RNTI. This may not specify a one-to-one mapping between the antenna ports of the EPDCCH and the PDSCH, but an association may be established as: The antenna port from which the PDSCH is conveyed using DMRS port 7 or 8 can be inferred from the channel over which the EPDCCH data symbols of a localized EPDCCH set is conveyed using any of the DMRS ports {107,108,109,110} of the same PRB bundle FIG. 5 is a flowchart 500 describing operations of an Enhanced Physical Downlink Control Channel (EPDCCH) with in accordance with other embodiments. The operations described in FIG. 5 may be performed by the MTC UE and/or the eNB, for example, and may include associations between antenna port or channels of EPDCCH in one sub-frame and a PDSCH in another sub-frame. The operations may be performed at least in part by one or more processors that may be coupled with memory/storage to execute instructions stored in the memory/storage.

At 502, an association may be determined between one or more first antenna ports that carry Enhanced Physical Downlink Control Channel (EPDCCH) data and one or more second antenna ports that carry Physical Downlink Shared Channel (PDSCH) data, wherein the association may vary according to one or more of a Radio Network Temporary Identifier (RNTI) of the MTC UE, a time factor, or another factor.

At 504, the BS may transmit EPDCCH data to the MTC UE via at least one of the one or more first antenna ports of the association during a first sub-frame.

At 506, the BS may transmit PDSCH data to the MTC UE via at least one of the one or more second antenna ports of the association during a subsequent second sub-frame. In embodiments, the first and second sub-frames may be included within a common physical resource block (PRB) bundle.

The operations of FIG. 5 employ a relationship or association between antenna ports or channels for EPDCCH and subsequent PDSCH. Based on the association, the MTC UE 104 may use the antenna port or channel on the EPDCCH data in one sub-frame to estimate the antenna port or channel for the PDSCH data in one or more subsequent sub-frames (e.g., the next sub-frame). This may provide improved estimation by the MTC UE 104 of the antenna port or channel on which the PDSCH will be delivered, and the estimation may use fewer resources of the MTC UE 104.

In other embodiments, MTC UE can further improve upon the channel estimation provided by associations between antenna ports for EPDCCH and PDSCH when decoding PDSCH. In one embodiment, MTC UE may use decoded EPDCCH symbols in one sub-frame as additional pilots to estimate the channel of PDSCH in the following sub-frame. Compared with using UERS port {7, 8} in the same sub-frame to estimate the channel for PDSCH, the channel estimation accuracy can be improved due to the additional reference symbols, especially when in low Doppler scenario where the channel varies slowly and the decoded EPDCCH symbol has a high correlation to the PDSCH channel. This improvement also comes at no additional overhead to the air interface UE-specific resource allocation for EPDCCH transmission is defined in some specifications (e.g., Release-11). Some embodiments may include up to 2 EPDCCH sets with PRB pair configuration. EPDCCH type (distributed or localized), DeModulation Reference Signal (DMRS) scrambling sequence initialization parameter and PUCCH resource starting offset for each EPDCCH set can be configured by eNB via UE specific RRC signalling. In addition, subframe configuration, where UE monitors UE specific search space on EDPCCH, can be configured by eNB.

When system bandwidth used by regular non-MTC UEs is greater than 1.4 MHz, the MTC UEs with reduced bandwidth support (e.g. 1.4 MHz or less) cannot access to the regular PDCCH region, which is greater than the MTC bandwidth. As described above, narrowband PDCCH or EPDCCH can be used for the downlink control channel. In addition, cell-specific or MTC region-specific EPDCCH resources may be used to define a non-UE-specific EPDCCH region that can be predefined or configured by eNB. This can support a large or massive number of MTC UE, which may be within one or more MTC regions within a cell. In embodiments, one EPDCCH set may be configured to simplify the implementation and reduce the power consumption for MTC UEs. The type of the EPDCCH set can be set as distributed type when configured, or the type of EPDCCH set can be eliminated in the EPDCCH configuration and distributed type can be set as default value to further reduce signaling overhead. (In some embodiments, localized EPDCCH may not be beneficial for cell specific or MTC region specific EPDCCH transmission due to the broadcast nature.) This may support MTC UE with bandwidth less than 1.4 MHz, e.g. 200 KHz system.

In embodiments, the non-UE-specific EPDCCH resource allocation for MTC UEs with reduced bandwidth support can be configured by eNB in a cell-specific or MTC region-specific manner and signaled via Master Information Block (MIB) or System Information Block (SIB).

Data symbols of an EPDCCH may be transmitted in a first sub-frame using a first antenna port within a non-user equipment (UE)-specific EPDCCH resource region that is configured or pre-defined in a cell-specific or machine type communication (MTC) region-specific manner for multiple MTC UEs. Resource allocation configuration, which may be pre-defined and/or be configured by the eNB, may include one or more of the following information: the PRB pair configuration, the subframe or plurality of subframes for MTC UE to monitor for EPDCCH transmissions, the EPDCCH DM-RS scrambling sequence initialization seed (e.g., as set in 3GPP TS36.211), the EPDCCH set index, the PUCCH 1a/1b resource starting offset. In another embodiment of the invention, the PRB pair configuration for the EPDCCH transmission can be defined as a function of cell identity, subframe index or a combination of the above parameters. Note that after eNB configures the UE specific EPDCCH resource allocation via dedicated RRC signalling, MTC UEs may use this UE specific configuration for the reception of EPDCCH transmission.

Figure 6:
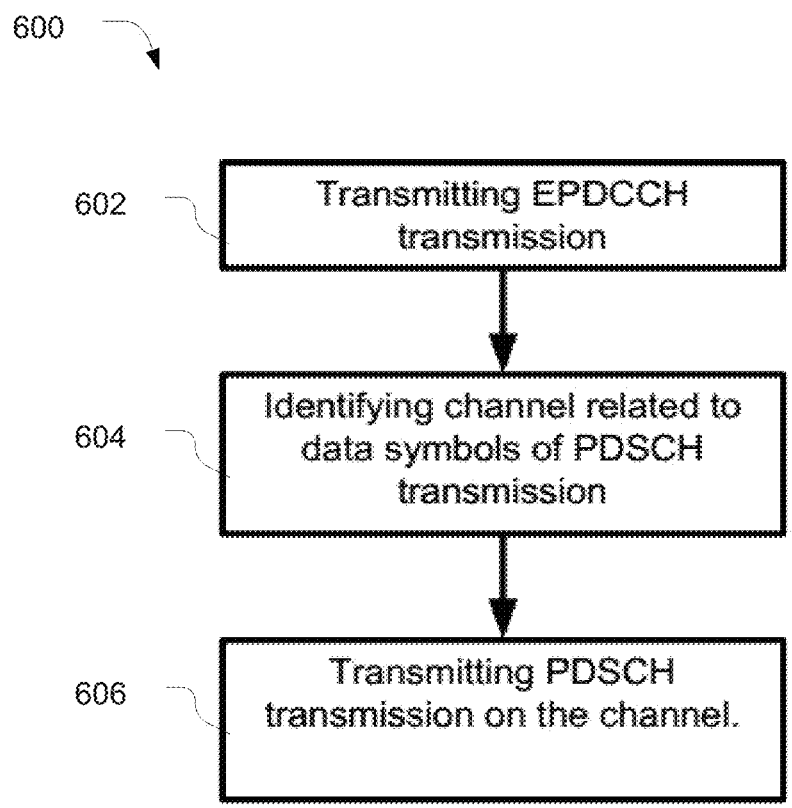
FIG. 6 is a flowchart describing operations of in another embodiment.

FIG. 6 is a flowchart 600 describing operations of in another embodiment in which the operations may include at 602 transmitting, by an enhanced NodeB (eNB) operable to perform Enhanced Physical Downlink Control CHannel (EPDCCH) and Physical Downlink Shared CHannel (PDSCH) transmission in a cellular network using narrow bandwidth, data symbols of an EPDCCH transmission in a first sub-frame using a first antenna port within a non-user equipment (UE)-specific EPDCCH resource region that is configured or pre-defined in a cell-specific or machine type communication (MTC) region-specific manner for MTC UEs.

At 604, the operations may further include identifying, by the eNB, a channel related to data symbols of a PDSCH transmission in a second sub-frame using a second antenna port, wherein the channel is based on the first sub-frame if the data symbols of the EPDCCH transmission and the data symbols of the PDSCH transmission are related to a same physical resource block (PRB) bundle. At 606, the operations may further include transmitting, by the eNB, the PDSCH transmission on the channel in the second sub-frame using the second antenna port.

Figure 7:
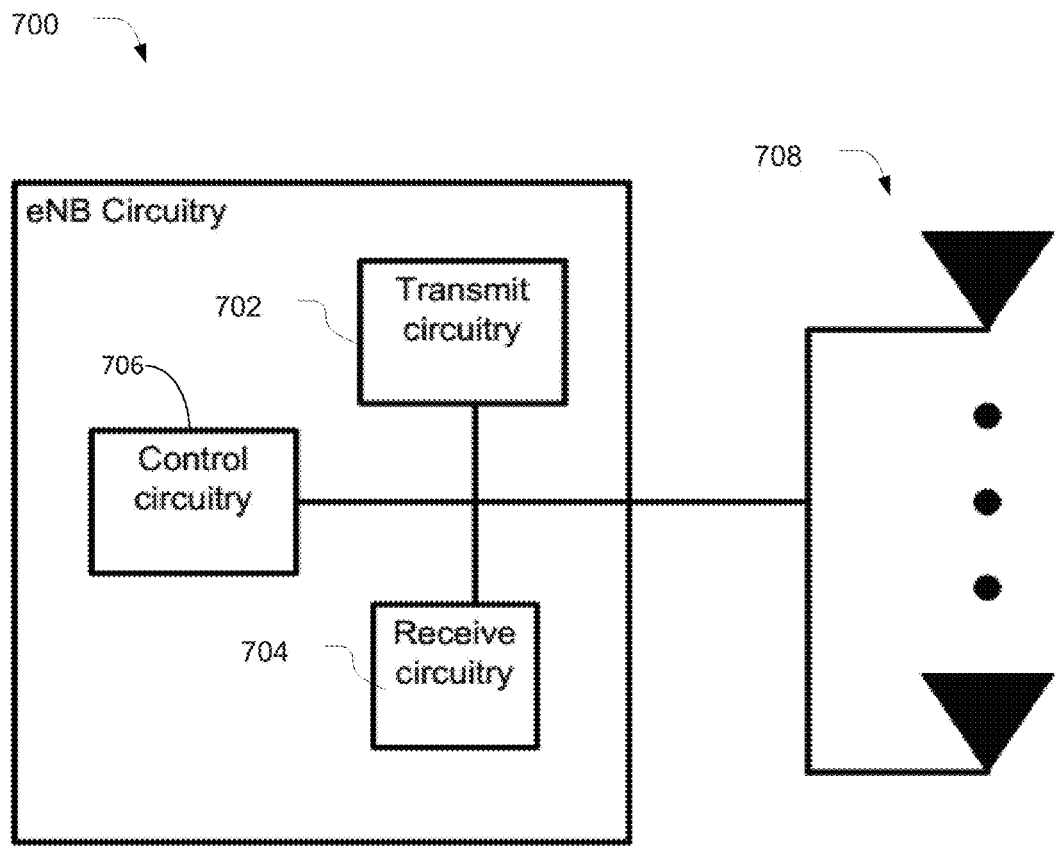
FIG. 7 illustrates circuitry that may be eNB circuitry in accordance with various embodiments.

FIG. 7 illustrates circuitry that may be eNB circuitry 700 in accordance with various embodiments. In embodiments, the eNB circuitry may include radio transmit circuitry 702 and receive circuitry 704 coupled to control circuitry. In embodiments, the transmit circuitry 702 and/or receive circuitry 704 may be elements or modules of transceiver circuitry. The eNB circuitry 700 may be coupled with one or more plurality of antenna elements of one or more antennas 708. The eNB circuitry 700 and/or its components may be configured to perform operations similar to those described herein.

For example, in eNB circuitry 700, the transmit circuitry 702 may be to transmit data symbols of an enhanced physical downlink control channel (EPDCCH) transmission in a first sub-frame using a first antenna port. The control circuitry 706 may be to identify a channel related to data symbols of a physical downlink shared channel (PDSCH) transmission in a second sub-frame using a second antenna port, wherein the channel is based on the first sub-frame if the data symbols of the EPDCCH transmission and the data symbols of the PDSCH transmission are related to a same physical resource block (PRB) bundle.

Figure 8:
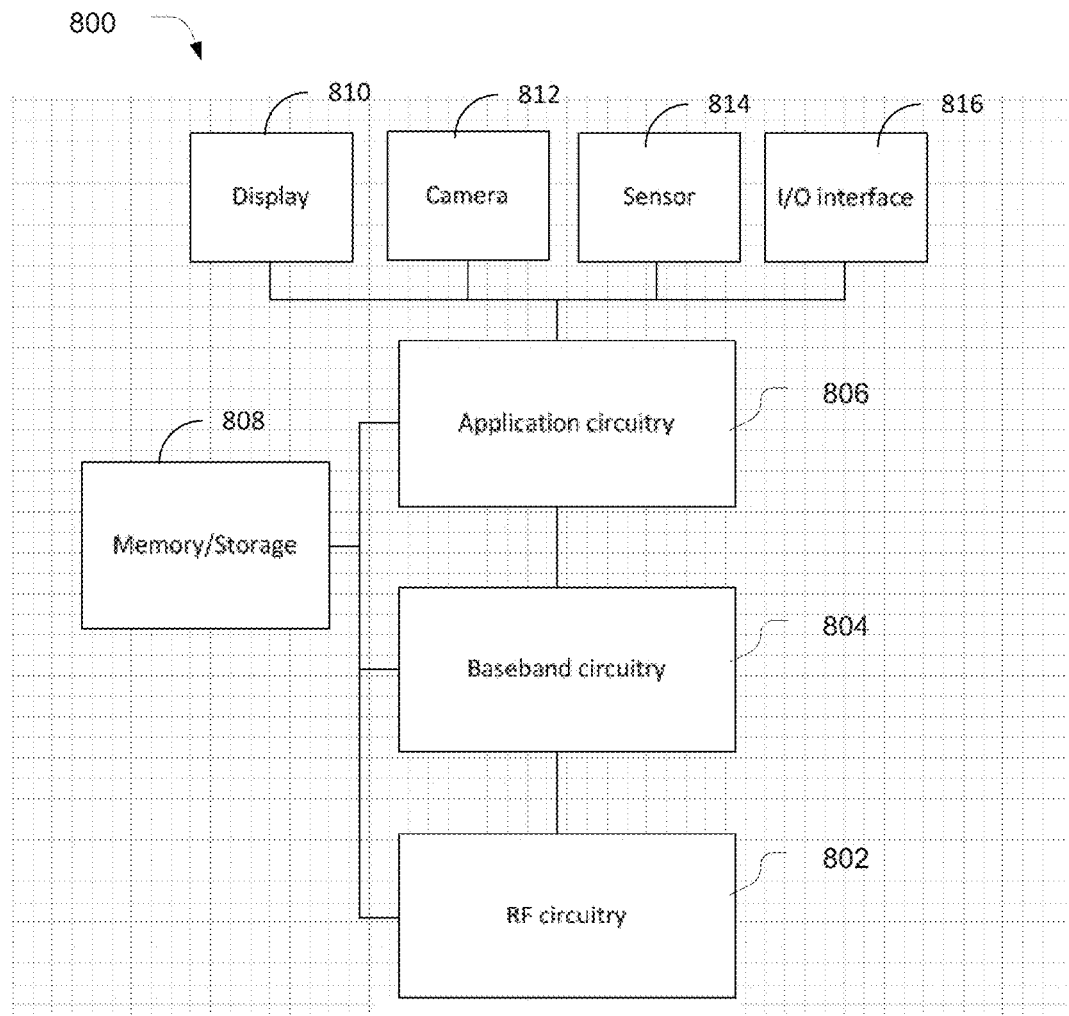
FIG. 8 illustrates, for one embodiment, an example system such as MTC UE.

FIG. 8 illustrates, for one embodiment, an example system such as MTC UE 800 comprising radio frequency (RF) circuitry 802, baseband circuitry 804, application circuitry 806, memory/storage 808, display 810, camera 812, sensor 814, and input/output (I/O) interface 816, coupled with each other at least as shown. The application circuitry may include circuitry such as, but not limited to, one or more single-core or multi-core processors. The processor(s) may include any combination of general-purpose processors and dedicated processors (e.g., graphics processors, application processors, etc.). The processors may be coupled with memory/storage and configured to execute instructions stored in the memory/storage to enable various applications and/or operating systems running on the system.

The baseband circuitry may include circuitry such as, but not limited to, one or more single-core or multi-core processors. The processor(s) may include a baseband processor. The baseband circuitry may handle various radio control functions that enables communication with one or more radio networks via the RF circuitry. The radio control functions may include, but are not limited to, signal modulation, encoding, decoding, radio frequency shifting, etc. In some embodiments, the baseband circuitry may provide for communication compatible with one or more radio technologies. For example, in some embodiments, the baseband circuitry may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry is configured to support radio communications of more than one wireless protocol may be referred to as multi-mode baseband circuitry.

In various embodiments, baseband circuitry may include circuitry to operate with signals that are not strictly considered as being in a baseband frequency. For example, in some embodiments, baseband circuitry may include circuitry to operate with signals having an intermediate frequency, which is between a baseband frequency and a radio frequency. RF circuitry may enable communication with wireless networks using modulated electromagnetic radiation through a non-solid medium. In various embodiments, the RF circuitry may include switches, filters, amplifiers, etc. to facilitate the communication with the wireless network. In various embodiments, RF circuitry may include circuitry to operate with signals that are not strictly considered as being in a radio frequency. For example, in some embodiments, RF circuitry may include circuitry to operate with signals having an intermediate frequency, which is between a baseband frequency and a radio frequency.

In various embodiments, the transmit circuitry, control circuitry, or receive circuitry discussed herein with respect to a UE or eNB may be embodied in whole or in part in one or more of the RF circuitry, the baseband circuitry, and/or the application circuitry. As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the electronic device circuitry may be implemented in, or functions associated with the circuitry may be implemented by, one or more software or firmware modules.

In some embodiments, some or all of the constituent components of the baseband circuitry, the application circuitry, and/or the memory/storage may be implemented together on a system on a chip (SOC). Memory/storage may be used to load and store data and/or instructions, for example, for system. Memory/storage for one embodiment may include any combination of suitable volatile memory (e.g., dynamic random access memory (DRAM)) and/or non-volatile memory (e.g., Flash memory).

Some non-limiting examples are provided below.

Example 1 may include a network node apparatus comprising: control circuitry to obtain association information that includes an association between one or more first antenna ports that carry Enhanced Physical Downlink Control Channel (EPDCCH) data and one or more second antenna ports that carry Physical Downlink Shared Channel (PDSCH) data; and transmit circuitry in communication with the control circuitry to: transmit the association information to a Machine Type Communication (MTC) User Equipment (UE), transmit, to the MTC UE, EPDCCH data via at least one of the one or more first antenna ports during a first sub-frame, the EPDCCH data to schedule PDSCH data in a second sub-frame that is after the first sub-frame, and transmit, to the MTC UE, the PDSCH data via at least one of the one or more second antenna port during the second sub-frame.

Example 2 may include the apparatus of example 1 and/or any other example described herein, wherein the first and second sub-frames are included within a common physical resource block (PRB) bundle.

Example 3 may include the apparatus of example 1 and/or any other example described herein, wherein the transmit circuitry further is to transmit the association information, the EPDCCH data, and the PDSCH data to the MTC UE over a narrow bandwidth portion of a broad bandwidth over which data is transmitted to other UE.

Example 4 may include the apparatus of example 3 and/or any other example described herein, wherein the narrow bandwidth portion is 1.4 Mhz or less.

Example 5 may include the apparatus of example 1, 2, or 3 and/or any other example described herein, wherein the transmit circuitry further is to transmit the association information, the EPDCCH data, and the PDSCH data to plural MTC UEs.

Example 6 may include the apparatus of example 1, 2, or 3 and/or any other example described herein, wherein the transmit circuitry further is to transmit the association information, the EPDCCH data, and the PDSCH data separately to a first plurality of MTC UEs and a second plurality of MTC UEs.

Example 7 may include the apparatus of example 1, 2, or 3 and/or any other example described herein, wherein the transmit circuitry further is to transmit the association information to the MTC UE via a Master Information Block (MIB).

Example 8 may include the apparatus of example 1, 2, or 3 and/or any other example described herein, wherein the transmit circuitry is to transmit the association information to the MTC UE via System Information Block (SIB).

Example 9 may include one or more computer-readable media having instructions that, when executed, cause a network node to: obtain association information that includes an association between one or more first antenna ports to be used to transmit Enhanced Physical Downlink Control Channel (EPDCCH) data and one or more second antenna ports to be used to transmit Physical Downlink Shared Channel (PDSCH) data; transmit the association information to plural Machine Type Communication (MTC) User Equipment (UE), transmit, to the MTC UE, EPDCCH data via at least one of the one or more first antenna ports during a first sub-frame, the EPDCCH data to schedule PDSCH data in a second sub-frame that is after the first sub-frame, and transmit, to the MTC UE, the PDSCH data via at least one of the one or more second antenna port during the second sub-frame.

Example 10 may include the one or more computer-readable media of example 9 and/or any other example described herein, wherein the first and second sub-frames are included within a common physical resource block (PRB) bundle.

Example 11 may include the one or more computer-readable media of example 9 or 10 and/or any other example described herein, wherein the instructions, when executed, cause the network node to transmit the EPDCCH in alternation among more than one first antenna ports.

Example 12 may include the one or more computer-readable media of example 9 or 10 and/or any other example described herein, wherein the instructions, when executed, cause the network node to obtain association information include instructions to obtain the association information in reference to a Radio Network Temporary Identifier for the MTC UEs.

Example 13 may include the one or more computer-readable media of example 9 or 10 and/or any other example described herein, wherein the instructions, when executed, cause the network node to obtain association information include instructions to obtain the association information in reference to a time factor.

Example 14 may include the one or more computer-readable media of example 9 or 10 and/or any other example described herein, wherein the association between the one or more first antenna ports and one or more second antenna ports is fixed.

Example 15 may include a method comprising: storing association information that includes an association between one or more first antenna ports that carry Enhanced Physical Downlink Control Channel (EPDCCH) data and one or more second antenna ports that carry Physical Downlink Shared Channel (PDSCH) data; transmitting the association information to a Machine Type Communication (MTC) User Equipment (UE), transmitting, to the MTC UE, EPDCCH data via at least one of the one or more first antenna ports during a first sub-frame, the EPDCCH data to schedule PDSCH data in a second sub-frame that is after the first sub-frame, and transmitting, to the MTC UE, the PDSCH data via at least one of the one or more second antenna port during the second sub-frame.

Example 16 may include the method of example 15 and/or any other example described herein, wherein the first and second sub-frames are included within a common physical resource block (PRB) bundle.

Example 17 may include the method of example 15 of 16 and/or any other example described herein, further including transmitting the association information, the EPDCCH data, and the PDSCH data to the MTC UE over a narrow bandwidth portion of a broad bandwidth over which data is transmitted to other UE.

Example 18 may include the method of example 17 and/or any other example described herein, wherein the narrow bandwidth portion is 1.4 Mhz or less.

Example 19 may include the method of example 15 of 16 and/or any other example described herein, further including transmitting the association information, the EPDCCH data, and the PDSCH data separately to a first plurality of MTC UEs and a second plurality of MTC UEs.

Example 20 may include the method of example 15 of 16 and/or any other example described herein, further including transmitting the association information, the EPDCCH data, and the PDSCH data to plural MTC UEs.

Example 21 may include the method of example 15 of 16 and/or any other example described herein, further including transmitting the association information to the MTC UE via a Master Information Block (MIB).

Example 22 may include the method of example 15 of 16 and/or any other example described herein, further including transmitting the association information to the MTC UE via System Information Block (SIB).

Example 23 may include a method comprising: receiving an association between one or more first antenna ports that carry Enhanced Physical Downlink Control Channel (EPDCCH) data and one or more second antenna ports that carry Physical Downlink Shared Channel (PDSCH) data; receiving EPDCCH data via at least one of the one or more first antenna ports during a first sub-frame, the EPDCCH data to schedule PDSCH data in a second sub-frame that is after the first sub-frame, and inferring from the EPDCCH data received via least one of the one or more first antenna ports a channel over which the PDSCH data is to be transmitted via the at least one of the one or more second antenna ports during the second sub-frame.

Example 24 may include the method of example 23 and/or any other example described herein, wherein the first and second sub-frames are included within a common physical resource block (PRB) bundle.

Example 25 may include the method of example 23 or 24 and/or any other example described herein, wherein the association between the first and second ports is fixed.

Example 26 may include the method of example 23 or 24 and/or any other example described herein, wherein the association includes alternation between ones of the first and second ports.

Example 27 may include the method of example 23 or 24 and/or any other example described herein, wherein the association includes reference to a Radio Network Temporary Identifier for the MTC UE.

Example 28 may include the method of example 23 or 24 and/or any other example described herein, wherein the association includes reference to a time factor.

Example 29 may include a method comprising: obtaining association information that includes an association between one or more first antenna ports to be used to transmit Enhanced Physical Downlink Control Channel (EPDCCH) data and one or more second antenna ports to be used to transmit Physical Downlink Shared Channel (PDSCH) data; transmitting the association information to plural Machine Type Communication (MTC) User Equipment (UE), transmitting, to the MTC UE, EPDCCH data via at least one of the one or more first antenna ports during a first sub-frame, the EPDCCH data to schedule PDSCH data in a second sub-frame that is after the first sub-frame, and transmitting, to the MTC UE, the PDSCH data via at least one of the one or more second antenna port during the second sub-frame.

Example 30 may include the method of example 29 and/or any other example described herein, wherein the first and second sub-frames are included within a common physical resource block (PRB) bundle.

Example 31 may include the method of example 29 or 30 and/or any other example described herein, further including transmitting the EPDCCH in alternation among more than one first antenna ports.

Example 32 may include the method of example 29 or 30 and/or any other example described herein, further including obtaining the association information in reference to a Radio Network Temporary Identifier for the MTC UEs.

Example 33 may include the method of example 29 or 30 and/or any other example described herein, further including obtaining association information include instructions to obtain the association information in reference to a time factor.

Example 34 may include the method of example 29 or 30 and/or any other example described herein, wherein the association between the one or more first antenna ports and one or more second antenna ports is fixed.

Example 35 may include an apparatus comprising: storage means for storing association information that includes an association between one or more first antenna ports that carry Enhanced Physical Downlink Control Channel (EPDCCH) data and one or more second antenna ports that carry Physical Downlink Shared Channel (PDSCH) data; and transmitting means for transmitting the association information to a Machine Type Communication (MTC) User Equipment (UE), transmitting, to the MTC UE, EPDCCH data via at least one of the one or more first antenna ports during a first sub-frame, the EPDCCH data to schedule PDSCH data in a second sub-frame that is after the first sub-frame, and transmitting, to the MTC UE, the PDSCH data via at least one of the one or more second antenna port during the second sub-frame.

Example 36 may include the apparatus of example 35 and/or any other example described herein, wherein the first and second sub-frames are included within a common physical resource block (PRB) bundle.

Example 37 may include the apparatus of example 35 or 36 and/or any other example described herein, wherein the transmitting means is further for transmitting the association information, the EPDCCH data, and the PDSCH data to the MTC UE over a narrow bandwidth portion of a broad bandwidth over which data is transmitted to other UE.

Example 38 may include the apparatus of example 37 and/or any other example described herein, wherein the narrow bandwidth portion is 1.4 Mhz or less.

Example 39 may include the apparatus of example 35 or 36 and/or any other example described herein, wherein the transmitting means is further for transmitting the association information, the EPDCCH data, and the PDSCH data separately to a first plurality of MTC UEs and a second plurality of MTC UEs.

Example 40 may include the apparatus of example 35 or 36 and/or any other example described herein, wherein the transmitting means is further for transmitting the association information, the EPDCCH data, and the PDSCH data to plural MTC UEs.

Example 41 may include the apparatus of example 35 or 36 and/or any other example described herein, wherein the transmitting means is further for transmitting the association information to the MTC UE via a Master Information Block (MIB).

Example 42 may include the apparatus of example 35 or 36 and/or any other example described herein, wherein the transmitting means is further for transmitting the association information to the MTC UE via System Information Block (SIB).

Example 43 may include one or more computer-readable media having instructions that, when executed, cause a Machine Type Communication (MTC) User Equipment (UE) to: receive an association between one or more first antenna ports that carry Enhanced Physical Downlink Control Channel (EPDCCH) data and one or more second antenna ports that carry Physical Downlink Shared Channel (PDSCH) data; receive EPDCCH data via at least one of the one or more first antenna ports during a first sub-frame, the EPDCCH data to schedule PDSCH data in a second sub-frame that is after the first sub-frame, and infer from the EPDCCH data received via least one of the one or more first antenna ports a channel over which the PDSCH data is to be transmitted via the at least one of the one or more second antenna ports during the second sub-frame.

Example 44 may include the one or more computer-readable media of example 43 and/or any other example described herein, wherein the first and second sub-frames are included within a common physical resource block (PRB) bundle.

Example 45 may include the one or more computer-readable media of example 43 or 44 and/or any other example described herein, wherein the association between the first and second ports is fixed.

Example 46 may include the one or more computer-readable media of example 43 and/or any other example described herein, wherein the association includes alternation between ones of the first and second ports.

Example 47 may include the one or more computer-readable media of example 43 and/or any other example described herein, wherein the association includes reference to a Radio Network Temporary Identifier for the MTC UE.

Example 48 may include the one or more computer-readable media of example 43 and/or any other example described herein, wherein the association includes reference to a time factor.

Example 49 may include an apparatus comprising: control circuitry to store association information that includes an association between one or more first antenna ports that carry Enhanced Physical Downlink Control Channel (EPDCCH) data and one or more second antenna ports that carry Physical Downlink Shared Channel (PDSCH) data; and transmit circuitry to transmit to a Machine Type Communication (MTC) User Equipment (UE), in accordance with the association information, EPDCCH data via at least one of the one or more first antenna ports during a first subframe, the EPDCCH data to schedule PDSCH data in a second sub-frame that is after the first sub-frame, and transmitting, to the MTC UE, the PDSCH data via at least one of the one or more second antenna ports during the second sub-frame.

Example 50 may include the apparatus of example 49 and/or any other example described herein, wherein the first and second sub-frames are included within a common physical resource block (PRB) bundle.

Example 51 may include the apparatus of example 49 or 50 and/or any other example described herein, wherein the transmit circuitry is further to transmit the EPDCCH data and the PDSCH data to the MTC UE over a narrow bandwidth portion of a broad bandwidth over which data is transmitted to other UE.

Example 52 may include the apparatus of example 51 and/or any other example described herein, wherein the narrow bandwidth portion is 1.4 Mhz or less.

Example 53 may include the apparatus of example 49 or 50 and/or any other example described herein, wherein the transmit circuitry is further to transmit the EPDCCH data and the PDSCH data separately to a first plurality of MTC UEs and a second plurality of MTC UEs.

Example 54 may include the apparatus of example 49 or 50 and/or any other example described herein, wherein the transmit circuitry is further to transmit the EPDCCH data and the PDSCH data to plural MTC UEs.

The foregoing description of one or more implementations provides illustration and description, but is not intended to be exhaustive or to limit the scope of the invention to the precise form disclosed. Modifications and variations are possible in light of the above teachings or may be acquired from practice of various implementations of the invention.

What is claimed is:

1. A network node apparatus comprising:
    control circuitry to obtain association information that is to indicate an association between one or more first antenna ports that are to carry Enhanced Physical Downlink Control Channel (EPDCCH) data and one or more second antenna ports that are to carry Physical Downlink Shared Channel (PDSCH) data to facilitate estimation of a channel over which the PDSCH data is to be transmitted; and
    transmit circuitry in communication with the control circuitry to:
        transmit the association information to a Machine Type Communication (MTC) User Equipment (UE),
        transmit, to the MTC UE, the EPDCCH data via at least one of the one or more first antenna ports during a first sub-frame, the EPDCCH data to schedule the PDSCH data in a second sub-frame that is after the first sub-frame, and
        transmit, to the MTC UE, the PDSCH data via at least one of the one or more second antenna ports during the second sub-frame.

2. The apparatus of claim 1, wherein the first and second sub-frames are included within a common physical resource block (PRB) bundle.

3. The apparatus of claim 1, wherein the transmit circuitry further is to transmit the association information, the EPDCCH data, and the PDSCH data to the MTC UE over a narrow bandwidth portion of a broad bandwidth over which data is transmitted to another UE.

4. The apparatus of claim 3, wherein the narrow bandwidth portion is 1.4 Mhz or less.

5. The apparatus of claim 1, wherein the transmit circuitry further is to transmit the association information, the EPDCCH data, and the PDSCH data to plural MTC UEs.

6. The apparatus of claim 1, wherein the transmit circuitry further is to transmit the association information, the EPDCCH data, and the PDSCH data separately to a first plurality of MTC UEs and a second plurality of MTC UEs.

7. The apparatus of claim 1, wherein the transmit circuitry further is to transmit the association information to the MTC UE via a Master Information Block (MIB).

8. The apparatus of claim 1, wherein the transmit circuitry further is to transmit the association information to the MTC UE via System Information Block (SIB).

9. One or more non-transitory computer-readable media having instructions that, when executed, cause a network node to:
    obtain association information that is to indicate an association between one or more first antenna ports to be used to transmit Enhanced Physical Downlink Control Channel (EPDCCH) data and one or more second antenna ports to be used to transmit Physical Downlink Shared Channel (PDSCH) data to facilitate estimation of a channel over which the PDSCH data is to be transmitted;
    transmit the association information to plural Machine Type Communication (MTC) User Equipments (UEs),
    transmit, to an MTC UE of the plural MTC UEs, the EPDCCH data via at least one of the one or more first antenna ports during a first sub-frame, the EPDCCH data to schedule the PDSCH data in a second sub-frame that is after the first sub-frame, and
    transmit, to the MTC UE, the PDSCH data via at least one of the one or more second antenna ports during the second sub-frame.

10. The one or more non-transitory computer-readable media of claim 9, wherein the first and second sub-frames are included within a common physical resource block (PRB) bundle.

11. The one or more non-transitory computer-readable media of claim 9, wherein the instructions, when executed, cause the network node to transmit the EPDCCH data in alternation among more than one first antenna ports.

12. The one or more non-transitory computer-readable media of claim 9, wherein the instructions, when executed, cause the network node to obtain association information include instructions to obtain the association information in reference to a Radio Network Temporary Identifier for the plural MTC UEs.

13. The one or more non-transitory computer-readable media of claim 9, wherein the instructions, when executed, cause the network node to obtain association information include instructions to obtain the association information in reference to a time factor.

14. The one or more non-transitory computer-readable media of claim 9, wherein the association between the one or more first antenna ports and one or more second antenna ports is fixed.

15. An apparatus comprising:
    control circuitry to store association information that is to indicate an association between one or more first antenna ports that are to carry Enhanced Physical Downlink Control Channel (EPDCCH) data and one or more second antenna ports that are to carry Physical Downlink Shared Channel (PDSCH) data to facilitate estimation of a channel over which the PDSCH data is to be transmitted; and transmit circuitry to transmit to a Machine Type Communication (MTC) User Equipment (UE), in accordance with the association information, the EPDCCH data via at least one of the one or more first antenna ports during a first sub-frame, the EPDCCH data to schedule the PDSCH data in a second sub-frame that is after the first sub-frame, and transmitting, to the MTC UE, the PDSCH data via at least one of the one or more second antenna ports during the second sub-frame.

16. The apparatus of claim 15, wherein the first and second sub-frames are included within a common physical resource block (PRB) bundle.

17. The apparatus of claim 15, wherein the transmit circuitry is further to transmit the EPDCCH data and the PDSCH data to the MTC UE over a narrow bandwidth portion of a broad bandwidth over which data is transmitted to another UE.

18. The apparatus of claim 17, wherein the narrow bandwidth portion is 1.4 Mhz or less.

19. The apparatus of claim 15, wherein the transmit circuitry is further to transmit the EPDCCH data and the PDSCH data separately to a first plurality of MTC UEs and a second plurality of MTC UEs.

20. The apparatus of claim 15, wherein the transmit circuitry is further to transmit the EPDCCH data and the PDSCH data to plural MTC UEs.

21. One or more non-transitory computer-readable media having instructions that, when executed, cause a Machine Type Communication (MTC) User Equipment (UE) to:
receive an association between one or more first antenna ports that are to carry Enhanced Physical Downlink Control Channel (EPDCCH) data and one or more second antenna ports that are to carry Physical Downlink Shared Channel (PDSCH) data;
receive the EPDCCH data via at least one of the one or more first antenna ports during a first sub-frame, the EPDCCH data to schedule PDSCH data in a second sub-frame that is after the first sub-frame, and
infer, based on the association, from the EPDCCH data received via at least one of the one or more first antenna ports a channel over which the PDSCH data is to be transmitted via the at least one of the one or more second antenna ports during the second sub-frame; and
decode the PDSCH data based on said inference of the channel.

22. The one or more non-transitory computer-readable media of claim 21, wherein the first and second sub-frames are included within a common physical resource block (PRB) bundle.

23. The one or more non-transitory computer-readable media of claim 21, wherein the association between the first antenna ports and the second antenna ports is fixed.

* * * * *